March 13, 1973 E. G. MORRIS 3,720,423
VEHICLE CONTROL MECHANISM
Filed March 8, 1971

INVENTOR.
ERRICK G. MORRIS
BY
TEAGNO & TODDY
ATTORNEYS

3,720,423
VEHICLE CONTROL MECHANISM
Errick G. Morris, Southampton, Pa., assignor to Eaton
Yale & Towne Inc., Cleveland, Ohio
Filed Mar. 8, 1971, Ser. No. 121,634
Int. Cl. B62d 1/14, 1/18
U.S. Cl. 280—87 A                    8 Claims

ABSTRACT OF THE DISCLOSURE

A brake and steering mechanism for a material handling vehicle which permits actuation of the brake by tilting the steering column of the vehicle. A steering shaft within the steering column effects steering when rotated and braking when tilted by means of a novel universal joint assembly including a rotatable and tiltable platform supporting the shaft which converts tilting movement of the upper portion of the shaft into axial motion of the lower portion of the shaft. The brake is actuated through a crank arm assembly by said axial movement of the steering shaft.

---

This invention relates to a vehicle control mechanism and more particularly to a combined steering and brake actuator.

Material handling vehicles are often provided with the capability of being operated in a variety of ways. For example, there are vehicles which can be operated conveniently while the operator is either sitting or standing, and others which can be operated either while sitting or standing on the vehicle or by an operator walking alongside. It can be appreciated that it is often a problem to provide controls for such vehicles which are readily operable regardless of the way in which the vehicle is operated—from the standpoint of both safety and convenience.

A special problem is presented by vehicles which are to be operated by someone either on or off the vehicle since the controls must be accessible from nearly any angle. Steering is relatively easy to provide since a vertically oriented column can be provided with a tiller bar or handle arrangement accessible over a 360° arc about the vehicle. Braking presents the most difficult problem. Since braking in an emergency situation must be provided for, it would be most desirable if braking were to be effected by a very natural movement on the part of the operator. Stepping on a pedal meets this criterion; however, it is not practicable on a walk/ride type vehicle.

Heretofore, the brake control on a walk/ride vehicle has been in the form of one or more levers or squeeze handles located somewhere on the steering column. The primary disadvantage of such an arrangement is that it requires a different type of movement by the operator depending on which side of the vehicle he happens to be. In an emergency situation any time required to determine whether a push or a pull is needed to actuate the brakes can mean the difference between avoidance of the situation and a serious accident.

Accordingly, it is an object of the invention to provide a vehicle brake actuator which operates in the same manner regardless of the direction in which it is applied.

Another object of the invention is to provide a brake actuator which is integrated with the steering system of the vehicle.

Another object of the invention is to provide such a brake actuator which is operated by tilting the steering column of the vehicle in any direction.

Another object of the invention is to provide a braking and steering system in which steering and braking functions can be carried on simultaneously with one function producing no adverse effects upon the other.

To meet the above objectives, the present invention provides a combined steering and braking system in which tilting of the steering column is converted into linear upward movement of a steering shaft arranged to operate a hydraulic brake cylinder. The steering shaft comprises an upper and lower shaft connected by a universal joint to accommodate tilting of the steering column and to aid in converting tilting movement of the column into linear movement of the steering shaft. In the illustrative embodiment the upper steering shaft is attached to and forms an extension of the steering column.

To provide the required motion conversion, the upper yoke of the universal joint is attached to a platform having an annular skirt portion which rides on a bearing at the base of a groove or channel formed in a support member rigidly attached to the vehicle frame. Tilting of the steering column causes the platform to pivot about one edge of the skirt portion producing a moment about that point tending to lift the universal joint and attached lower shaft, which are restrained from lateral movement by a bushing. The lower end of the lower steering shaft is splined for connection to a steering yoke and is also adapted for connection to a bell crank linkage for brake operation.

Other objects and advantages of the invention will be apparent from the specification when taken in connection with the accompanying drawings, wherein.

Figure 1:
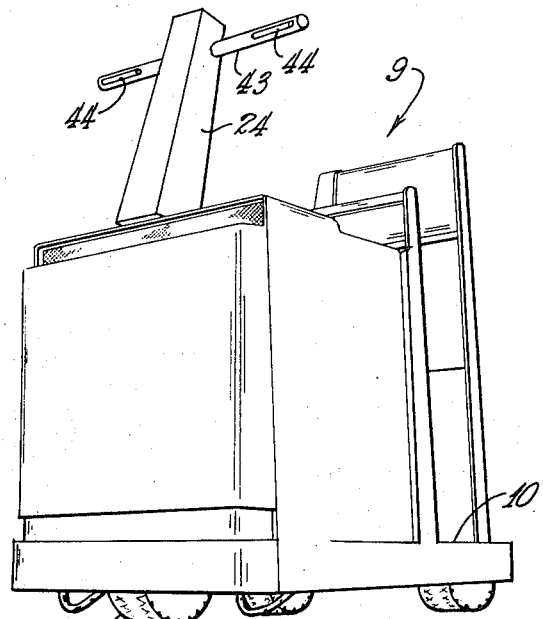
FIG. 1 is a perspective view of a material handling vehicle incorporating the invention.
Figure 3:
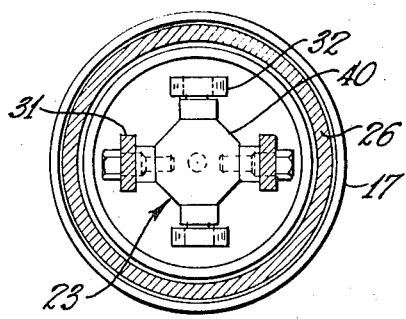
FIG. 3 is a sectional view taken along line 3—3 of FIG. 2.
Figure 2:
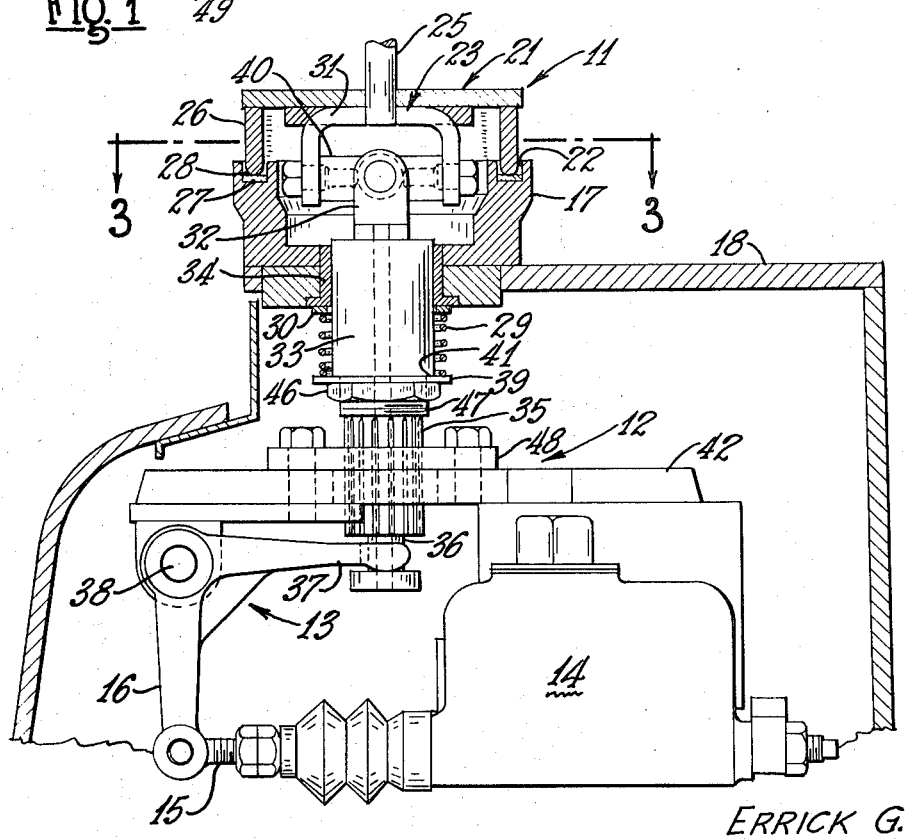
FIG. 2 is a side elevation view, partly in section, of the invention as applied to the braking system of a vehicle according to FIG. 1.

The vehicle 9 depicted in FIG. 1 is of a type which is adapted to be operated by a man either standing on a platform 10 or walking alongside. Referring to FIG. 2, the steering and brake actuating mechanism of the invention comprises a universal joint assembly, designated generally by the numeral 11, a steering yoke assembly 12, and a crank assembly 13 mounted on the yoke assembly and acting between a brake cylinder 14 and the universal joint.

The brake cylinder 14 can be of conventional design, such as a common hydraulic master cylinder actuated by displacement of a piston by axial movement of an actuating rod 15 attached to one leg 16 of the crank assembly 13.

The universal joint assembly 11 comprises a cylindrical support member 17 rigidly attached to the frame 18 of vehicle 9, a tilt platform 21 which rides in an annular groove 22 formed in the support member 17, and a universal joint 23.

The steering column 24 of the vehicle 10 is attached to the platform 21 through an upper steering shaft 25. The platform 21 includes an annular skirt portion 26 which extends downward therefrom to ride on a bearing member 27 at the base of the groove 22. The lower edge 28 of the skirt 26 is rounded to facilitate tilting of the platform 21, as will be described more thoroughly.

The universal joint 23 comprises an upper yoke 31 attached to the underside of platform 26 and upper steering shaft 25, a lower yoke 32 attached to the lower steering shaft 33 and a cross 40 connecting the two yokes. The lower steering shaft 33 is received in a sleeve bearing 34 pressed or otherwie fitted to the frame 18.

In order to maintain the steering column 24 in a normally upright position a damper spring 29 surrounds the shaft 33 and is compressed between an upper washer 30 bearing against the frame 18 and a lower washer 39 bearing against a shoulder 41 formed on the shaft 33. A nut 46 received on a threaded portion 47 of the shaft 33 retains the washer 39 against the shoulder 41. The spring 29 biases the universal joint 23 downward just enough to normally maintain the skirt 26 seated on the bearing 27.

The lower portion of the lower steering shaft 33 is splined at 35 for connection to the vehicle steering system, and has a relieved area 36 adjacent its lower end in which the end of leg 37 of crank assembly 13 rides. The crank assembly 13 is substantially L-shaped and is pivotally mounted at 38 to a steering yoke 42 which also serves to support the brake cylinder 14.

The splined portion 35 receives a flange member 48 which can be bolted or otherwise fastened to the steering yoke 34 to connect the steering column 24 to the steered wheel or wheels of the vehicle 9.

In the illustrative embodiment the vehicle 9 includes a single steered wheel 49. The steering yoke 48 extends downward (not shown) and is operatively connected to the steered wheel, either directly or through suitable conventional steering gear. Since the brake cylinder is attached to the rotatable steering yoke 42 flexible hydraulic connections are provided as necessary.

OPERATION

Referring to FIG. 1, the vehicle 9 is steered by rotating the steering column 24 about a vertical axis by means of a steering handle 43. For added convenience speed controls 44 can be located on both sides of the handle 43.

As described above, rotation of the steering column and the attached upper steering shaft rotates the steering platform 21 on the bearing member 27 in groove 22 and rotates the universal joint 23 and the splined lower steering shaft 33 attached thereto to effect steering of the single steered wheel 49 of the embodiment illustrated. It can be appreciated that for steering movement with the steering column vertically oriented the universal joint 23 is inoperative except to transmit steering torque.

To effect braking the steering column 24 is tilted in any direction. Tilting the column 24 and the attached upper steering shaft 25 tilts the platform 21 in the groove 22. As the platform tilts about edge 28 of skirt 26 a moment is developed about the pivot point of the skirt tending to lift the universal joint 23 and consequently moving the lower steering shaft axially upward. As the shaft 33 moves upward, the crank assembly 13 rotates counterclockwise as shown in FIG. 2 to move the brake actuating rod 15 inward to actuate the hydraulic brake. The universal joint 23 insures that the shaft 33 moves uniformly upward when the platform 21 is tilted regardless of the angular position of the platform. The universal joint also permits braking and steering simultaneously without one function adversely affecting the other.

Under normal, non-braking conditions the spring 29 maintains the upper steering shaft and steering column in a vertical position.

As specifically applied to the walk/ride type of vehicle illustrated in FIG. 1, the invention represents a significant safety improvement over prior systems in which separate brake controls were required. Whether an operator is on the vehicle or standing on the floor on any side of the vehicle he can react in a natural way to effect braking—that is to pull a handle (in this case the steering column) straight toward him. As described above, pulling the steering column 24 in any direction applies the brakes without affecting steering.

I claim:

1. In a vehicle having at least one steerable wheel and means for braking said vehicle; steering means connected to said wheel and operable to effect steering movement of said wheel upon rotation thereof; a first shaft supported for rotation about a substantially vertical axis and for axial movement, said shaft having one end connected to said steering means and the other end connected to a first half of a universal joint assembly; a second shaft having one end connected to a second half of said universal joint assembly and the other end extending outward of said vehicle; means mounting said second shaft for rotary movement about a substantially vertical axis and for tilting movement about at least one pivot point radially spaced from said axis, the moment produced about said pivot point by said tilting movement resulting in axial movement of said first shaft; and means responsive to axial movement of said first shaft for actuating said braking means, said means mounting said second shaft including bearing means at said at least one pivot point operative to permit simultaneous rotary and axial movement of said first shaft.

2. Apparatus according to claim 1, in which said means mounting said second shaft supports said shaft for tilting movement about an infinite number of pivot points in a 360° arc about said axis.

3. Apparatus according to claim 1, in which said means mounting said second shaft comprises a first annular member rigidly attached to said vehicle and having an upwardly facing groove formed therein, and a second complemental annular member attached to said second half of said universal joint assembly and receivable in said groove for rotary and pivotal movement therein relative to said first annular member.

4. Apparatus according to claim 3, including a bearing member at the base of said groove, on which said first annular member rides.

5. Apparatus according to claim 1, in which said braking means comprises a hydraulic master cylinder actuated by axial movement of a piston rod, said means responsive to axial movement of said first shaft including a bell crank operatively connecting said first shaft and said piston rod.

6. Apparatus according to claim 1, in which said first shaft includes a splined section for connection to said steering means, said splined section permitting sliding movement of said first shaft relative to said steering means when said second shaft is tilted.

7. In a vehicle having at least one steerable wheel and means for braking said vehicle; steering means connected to said wheel and operable to effect steering movement of said wheel upon rotation thereof, a first shaft supported for rotation about a substantially vertical axis and for axial movement, said shaft having one end connected to said steering means and the other end connected to a first half of a universal joint assembly; a second shaft having one end connected to a second half of said universal joint assembly and the other end extending outward of said vehicle; means mounting said second shaft for rotary movement about a substantially vertical axis and for tilting movement about at least one pivot point radially spaced from said axis, said mounting means comprising a first annular member rigidly attached to said vehicle and having an upward facing groove formed therein and a second complemental annular member attached to said second half of said universal joint assembly and receivable in said groove, the moment produced about said pivot point by said tilting movement resulting in axial movement of said first shaft; and means responsive to axial movement of said first shaft for actuating said braking means.

8. Apparatus according to claim 7, including a bearing member at the base of said groove, on which said first annular member rides.

References Cited

UNITED STATES PATENTS

| 2,128,969 | 9/1938 | Shafer | 288—88 |
| 855,711 | 6/1907 | Lambert | 188—109 X |
| 2,471,244 | 5/1949 | Self | 180—82 X |
| 1,311,333 | 7/1919 | Fairchilds | 188—109 X |
| 951,984 | 3/1910 | Coffin | 74—486 |

FOREIGN PATENTS

| 1,019,253 | 1/1953 | France | 18—77 H |

BENJAMIN HERSH, Primary Examiner

J. P. SILVERSTRIM, Assistant Examiner

U.S. Cl. X.R.

74—486; 180—19 S, 19 H, 77 H